United States Patent [19]

Valentin et al.

[11] 4,054,430

[45] Oct. 18, 1977

[54] METHOD FOR SEPARATING THE CONSTITUENTS OF A GAS MIXTURE BY MAKING USE OF A RAPID SELECTIVE ADSORBENT

[75] Inventors: Patrick Valentin, Pont-Eveque; Germain Hagenbach, Vernaison; Jean-Louis Duran; Maurice Fromager, both of Lyon, all of France

[73] Assignee: Societe Nationale Elf Aquitaine, Paris La Defense, France

[21] Appl. No.: 656,541

[22] Filed: Feb. 6, 1976

[30] Foreign Application Priority Data

Feb. 13, 1975 France .............................. 75.04525

[51] Int. Cl.² ............................................. B01D 15/08
[52] U.S. Cl. ..................................... 55/67; 208/310 R
[58] Field of Search ....................... 55/67, 74, 75, 197; 210/31 C; 208/310

[56] References Cited

U.S. PATENT DOCUMENTS

| | | | |
|---|---|---|---|
| 3,457,704 | 7/1969 | Sanford et al. | 55/67 |
| 3,654,145 | 4/1972 | Brunnock et al. | 55/67 X |
| 3,699,182 | 10/1972 | Cattanach | 55/67 X |
| 3,721,064 | 3/1973 | Symoniak et al. | 55/75 X |
| 3,903,187 | 9/1975 | Geissler | 210/31 C |

*Primary Examiner*—John Adee
*Attorney, Agent, or Firm*—Sughrue, Rothwell, Mion, Zinn and Macpeak

[57] ABSTRACT

In a first step of the method, the gas mixture to be treated is injected into a column swept by a continuous stream of carrier gas and containing a suitable selective solid adsorbent until saturation of this latter by the adsorbed constituent of the gas mixture. In a second step, small quantities of the mixture to be treated and representing a fraction of the quantity injected into the column during the first step are injected periodically so as to collect successively at the column outlet a fraction which is enriched in the non-adsorbed constituent and a fraction which is purified in the adsorbed constituent.

12 Claims, 1 Drawing Figure

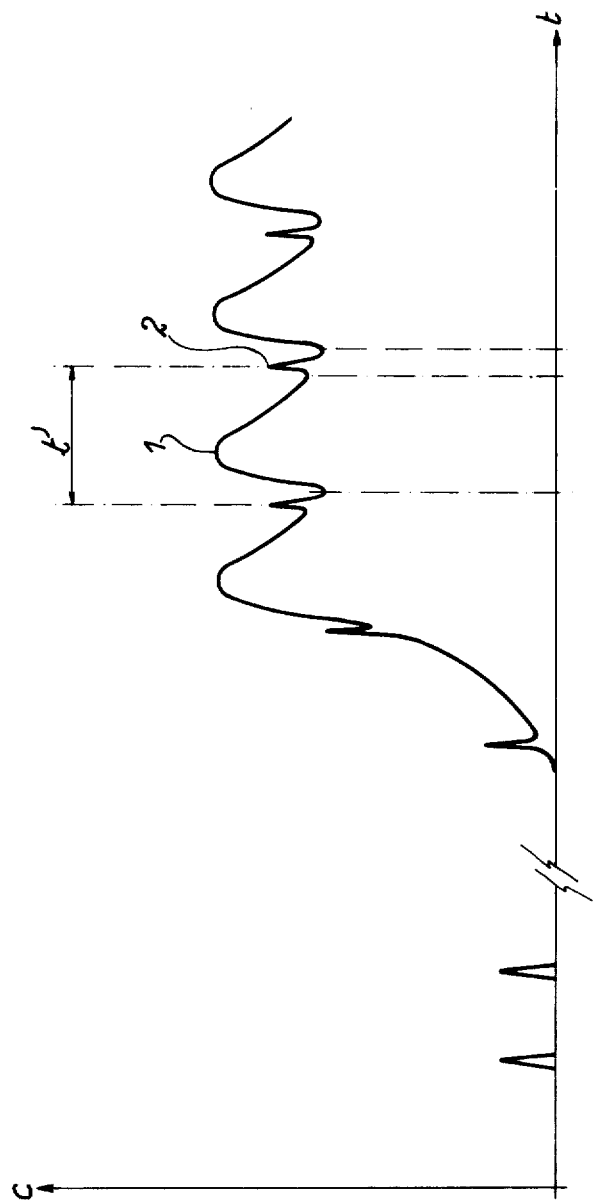

METHOD FOR SEPARATING THE CONSTITUENTS OF A GAS MIXTURE BY MAKING USE OF A RAPID SELECTIVE ADSORBENT

This invention relates to a method for separating the constituents of a gas mixture in a practically isothermal and isobaric process in which the separating means consist of a selective solid adsorbent.

This method is more especially applicable to the separation of n-paraffin-isoparaffin mixtures.

There are in existence at the present time two types of conventional methods for separating the constituents of gas mixtures such as is-normal paraffin mixtures.

In the first of these methods, molecular sieves are employed as selective adsorbent. The method consists in a first stage in passing the mixture through a column containing a molecular sieve which fixes the n-paraffins by adsorption and permits the passage of the isoparaffins which are then obtained at a high level of purity; this first stage comes to an end when the sieve is saturated with n-paraffins. After the injection of the mixture has been stopped, the column is purged during the second stage in order to remove the isoparaffins which are present in the vapor phase. Finally, the n-paraffins which were previously adsorbed are recovered by desorption during the third stage. This desorption is usually performed by creating a vacuum within the column but may also be carried out by any suitable means such as, for example, heating of the column, use of an auxiliary desorbent and so forth.

In practice, three columns arranged in parallel are employed in order to carry out a continuous separation process.

The second conventional method is gas-phase chromatography involving the use of a liquid stationary phase such as, for example, squalane deposited on a support. Non-continuous injections of charge are passed into a column and eluted by a carrier gas.

In contrast to the first method in which the molecular sieve adsorbs the n-paraffins which are subsequently recovered by displacing the absorption equilibrium (pressure drop, temperature rise, use of a desorbent and so forth), the stationary phase employed in conventional chromatography has the sole effect of selectively retaining the different components of the mixture; in order to obtain separation (without modification of the operating conditions of the column), a stationary phase is chosen so as to have sufficiently different retention times in the case of the components of the mixture.

The methods described in the foregoing are subject to disadvantages. In fact, in the first method which makes use of molecular sieves, the kinetics or the rate of desorption of the n-paraffins is a slow process and this calls for very large quantities of sieve material. Moreover, in the case of light paraffins, desorption by reduction of pressure is a costly method from the point of view of power consumption. Moreover, although the method makes it possible to obtain high-purity isoparaffins (non-adsorbed compound), it does not permit the production of high-purity n-paraffins by reason of the isoparaffins which are present in the vapor phase or those which are adsorbed on the binder of the molecular-sieve crystals.

So far as the second method is concerned, it differs from the preceding in that pure products may be obtained but does not make it possible to achieve high levels of productivity.

The present invention is directed to a practically isothermal and isobaric method for separating the constituents of a gas mixture and overcoming the disadvantages mentioned in the foregoing.

The invention has for its object a method for the treatment of a gas mixture which permits the separation of at least one of its constituents, characterized in that the mixture to be treated is injected in a first step into a column swept by a continuous stream of carrier gas and containing a suitable selective solid adsorbent until saturation of said selective adsorbent by the adsorbed constituent of the gas mixture. In a second step, when continuous injection of the gas mixture has been discontinued, small quantities of the gas mixture to be treated and representing a fraction of the quantity injected into the column during the first step are injected periodically so as to collect successively at the outlet of the column a fraction which is enriched in the non-adsorbed constituent and a fraction which is purified in the adsorbed constituent.

The process is illustrated in the figure which gives the curve of variation of the molar fractions at the outlet of the column as a function of time. There can be observed a saturation of the column and an elution front (1) of the adsorbed compound on which are superimposed the peaks (2) of the non-retained compound. The time interval ($t'$) which elapses between the origin of two successive peaks (2) represents the duration of the cycle.

In contrast to the methods of the prior art, the method in accordance with the invention makes it possible to obtain the constituent retained by the sieve at a high degree of purity as well as a mixture which is highly enriched in the non-retained constituent. As will become apparent later on, the preferred operating conditions for the application of the method can be determined according to the final objective to be achieved, namely a product having high purity or a mixture which is enriched in the non-retained constituent.

The method according to the invention is applicable to the treatment of all gas mixtures. It will be readily understood that efficient treatment is dependent on the need to ensure that the selective solid adsorbent to be employed is carefully chosen as a function of the constituents of the mixture to be treated in order that said adsorbent should retain one fraction of the mixture without retaining the other.

The selective adsorbent aforesaid can consist, for example, of activated carbon, alumina, silica gel, natural or synthetic zeolites, especially zeolites of type A, Y, X and mordenites such as, for example, the zeolites of type 3A, 4A, 5A, 10X and 13X.

The method according to the invention is clearly applicable to the treatment of a gas mixture containing more than two substances. In this case, it will be possible to obtain the separation of the different constituents into two distinct families.

By way of example, the method can be applied to the treatment of mixtures of n-paraffins and of isoparaffins. There will be chosen for the treatment of these mixtures a molecular sieve type 5A in which the pore diameter permits the adsorption solely of the n-paraffins.

The method according to the invention consists in a first step in saturating the selective solid adsorbent. The gas mixture to be treated is accordingly injected continuously into the column; as long as the molecular sieve is not saturated, it will adsorb the adsorbable constituent whilst the residual fraction of the mixture leaves the column after being passed through this latter by the carrier gas which continuously sweeps the column. As soon as the adsorbable constituent is detected at the exit of the column, the injection of the mixture is stopped and the first step of the method is completed. When carrying out the second step of the method during a periodic cycle, small quantities of mixtures to be treated are fed into the column which is still continuously swept by the carrier gas. A gas mixture which is enriched in the non-retained constituent and in the high-purity retained constituent is collected successively at the product end of the column.

One of the essential characteristics of the method lies in the fact that, in order to obtain the advantages of the invention, it is absolutely necessary to introduce into the column only small quantities of mixture to be treated. These quantities will be smaller that 40 vol.% of the quantity which it has been necessary to inject for the saturation of the sieve and will often be considerably less than this quantity.

As has been seen in the foregoing, the choice of the selective solid adsorbent is essentially dependent on the mixture to be treated. It will be preferable to choose molecular sieves having physical properties which are very well suited to the method, the texture of said molecular sieves being selected in accordance with the mixture.

The carrier gas employed must be inert with respect to the constituents of the mixture and can be selected from the gases employed in this type of separation process such as helium, nitrogen, hydrogen and so forth.

The throughput of carrier gas will be a function of the size of the column and will usually be such that the volume ratio $$\frac{\text{carrier gas}}{\text{charge}}$$

will be within the range of 0.05 to 10.

As has been stated in the foregoing, the method according to the invention can be carried into effect either for the purpose of obtaining a very pure product or for the purpose of continuously obtaining large quantities of a mixture which is enriched in the other constituent.

Especially in regard to the operating conditions, the choice of objective will have an influence on the quantities periodically injected and on the periodicity of these injections. In fact, if the method has for its final object the enrichment in non-adsorbed constituent, for example in isoparaffins in the treatment of iso- and n-paraffin mixtures, the quantity injected periodically will be smaller than 40% of the total quantity injected for saturation of the selective adsorbent. On the other hand, if the final object to be achieved is high-purity production of the adsorbed constituent, namely the n-paraffins in the case of the iso- and n-paraffin mixtures, the quantities injected periodically will usually be smaller and less than 20% of the total quantity.

The quantities given above can be defined only in a relative manner since they are essentially dependent on the size of the column.

The concept of quantities injected periodically may be related to the concept of injection time. In point of fact, the quantity injected is the product of the rate of feed of the mixture and of the injection time.

The injection time will usually range from 1 to 120 seconds and if the application of the method has for its final object to obtain a pure product, this period will preferably be shorter than 30 seconds.

The time-duration of the cycle ($t'$) will also have an influence on the quality of the separation and is usually within the range of 10 to 800 seconds. The longer the cycle and the better the separation so that, especially if it is desired to obtain a pure product, it will therefore be an advantage to optimize the conditions so as to obtain the high-purity product with satisfactory efficiency.

This optimization can be expressed by the time ratio:

$$\frac{\text{injection time}}{\text{cycle time}}$$

which will usually be less than 0.4 for the enrichment application and less than 0.2 for the pure product application.

The method according to the invention can be carried into practical effect over wide ranges of temperature, for example between 20° and 500° C and of pressure, for example between 1 and 100 bar.

The preferred application of the method according to the invention is the treatment of isoparaffin - n-paraffin mixtures in order to obtain either very pure n-paraffins or large quantities of a mixture enriched in isoparaffins. the latter application is of great importance from an industrial point of view since improved bases for gasoline can accordingly be obtained from an isomerizate.

The method according to the invention therefore offers an advantage in that it can be employed within a fairly low temperature range, for example between 100° and 200° C and permits operation at a relatively high pressure of 10 to 30 bar. In comparison with methods of the prior art, these operating conditions permit appreciable savings both in investment costs and in utility requirements.

A better understanding of the invention will be obtained from a perusal of the following examples which are given without any implied limitation.

EXAMPLE 1

This example illustrates the use of the method according to the invention for the purification of a cut of n-pentane containing isoparaffins as impurities.

The treated charge is a technical n-pentane having the following composition:

| | |
|---|---|
| n-butane | 140 ppm |
| isopentane | 5% |
| n-pentane | 92.4% |
| 22-dimethylbutane | 0.21% |
| cyclopentane | 2.15% |

The column employed has a length of 1.50 m, a diameter of 125 mm and is filled with 12.8 Kg of molecular sieve type 5A (small sticks 3 mm in length and 1.5 mm in diameter). The column operates at a substantially atmospheric pressure. The column is swept with a non-adsorbable carrier gas consisting of nitrogen which is introduced continuously at the rate of 0.3 liter per second (measured under normal conditions) and at a flow velocity of 7.7 cm/sec.

During the initial step, the mixture to be treated is vaporized continuously at a temperature of 255° C in the carrier gas. The mixture to be treated is fed into the vaporizer in liquid form at a volume rate of flow of 4.8 cm³/sec. Injection is maintained for approximately 7 minutes until seaturation of the sieve is achieved.

The effluents discharged from the column are trapped by liquid nitrogen devices (−120° C).

During the second step, 1,800 g/hr of mixture to be separated in liquid form are introduced every four minutes for a period of 40 seconds under the same conditions as before.

There are collected at the product end of the column 1050 g/hr of a cut of n-pentane having 99.82% purity; the separating efficiency is 60% and the purity obtained corresponds to an enrichment factor of approximately 40.

EXAMPLE 2

This example shows the ultra-purification of a pure commercial n-pentane.

The charge (n $C_5$ R.P. Carlo Erba) has the following composition:

| n-pentane | 99.3% |
|---|---|
| isopentane | 3,400 ppm |
| 22-dimethylbutane | traces |
| cyclopentane | 3,300 ppm |

This charge is treated in accordance with the technique described in the previous example except for the conditions of injection into the column. In fact, the charge is injected at a higher flow rate of 5.4 cm³/sec (liquid charge) for a period of 50 seconds, namely 2700 g/hr whilst the cycle remains unchanged (four minutes).

n-pentane having 99.995% purity is obtained at the product end of the column. This corresponds to an enrichment factor of 140 whilst the hourly production is 1.680 kg.

EXAMPLE 3

This comparative example is intended to illustrate the advantages of the invention over the methods of the prior art.

In this example, a charge of pure n-pentane (99.4% Extra Merck n $C_5$) is treated in accordance with the conventional technique of gas-liquid chromatography. The column adopted in this case is similar to the column previously employed in which the stationary phase is squalane.

The operating conditions are optimized, especially at the trapping level in order to obtain a high degree of purity. The n-pentane produced has 99.994% purity.

Although this value is very close to that of Example 2, it is possible under these operating conditions to produce only 0.475 Kg/hr, therefore four times less than in the method according to the invention although the initial charge is of higher purity.

If the operating conditions of the chromatographic column are modified in order to achieve enhanced productivity, it is possible to attain an hourly production of 0.890 Kg but the purity of n-pentane is in that case only 99.95%.

EXAMPLES 4 to 11

In these different examples, there is treated a charge derived from an isomerization unit and essentially consisting of a mixture of various paraffins containing 5 and 6 atoms of carbon per molecule. The object of the treatment is to enrich the charge in isoparaffins in order to obtain gasolines having a high octane number.

The so-called Research Octane Number (R.O.N.) as measured with the C.F.R. motor is added to the composition of the charge given hereunder.

| Isopentane | 41.36 | |
|---|---|---|
| n-pentane | 12.44 | |
| 2,2-dimethylbutane | 12.63 | |
| 2,3-dimethylbutane | 3.77 | 36.38 |
| 2-methylpentane | 17.67 | |
| 3-methylpentane | 2.31 | |
| n-hexane | 5.78 | |
| methyl cyclopentane | 1.09 | |
| cyclohexane | 2.95 | |
| R.O.N. | 81.5 | |

In the case of all these examples, the column was saturated at the time of the initial step by continuous injection of the charge. Saturation was obtained after approximately 8 minutes and 30 seconds in the case of Examples 4 to 9 and after approximately 4 minutes in the case of Examples 10 and 11, the rate of injection of the charge being substantially the same; this difference is due to the fact that the columns employed in these two examples are shorter. The column having a diameter of 35 mm is filled with molecular sieve type 5A.

The operating conditions of the second step are given in the case of all these examples in Table I hereunder. The operating pressure of the method was 1.2 bar and the carrier gas employed was hydrogen in all these examples.

Finally, the constituents of the effluent discharged from the column were collected by two series of traps:
a trap consisting of solid carbon dioxide and acetone (−80° C) in the case of the n-paraffin fraction,
a trap consisting of solid carbon dioxide and acetone (−80° C) and a liquid nitrogen trap which are placed in series for the isoparaffin fraction.

In all these examples, the injection time was 1 minute.

In the accompanying Table I, VVH represents the volume of injected (liquid) charge times the volume of molecular sieve and per hour and λ represents the ratio of the quantity injected periodically with respect to the quantity injected in the first step for saturation of the sieve.

Analysis of the effluents has given the results which are recorded in the accompanying Table II.

The extraction rate is defined by the formula $$\frac{Nc - Ni}{Nc}$$

wherein
Nc represents the weight of n-paraffins in the charge
Ni represents the weight of n-paraffins in the isoparaffin cut.

A study of the results recorded in the accompanying table II shows that the best extraction rates are obtained when λ is of low value. In fact, in Examples 10 and 11 in which λ is equal to 27.2, the extraction rates are in the vicinity of 50% and therefore of a very low order. It can also be observed that the quality of gasolines obtained in these examples (R.O.N. = 86) is relatively inferior.

A comparison of Examples 8 and 9 also shows that the extraction rate and the R.O.N. of the gasoline obtained are better when the ratio $$\frac{\text{time of cycle}}{\text{time of injection}}$$

increases. It can also be noted by comparing on the one hand Examples 5 and 7 and on the other hand Examples 6 and 8 that a slight increase in temperature results in a higher production of isoparaffins in the case of substantially equal extraction rates and values of R.O.N.

EXAMPLE 12

This example illustrates the application of the method according to the invention to the treatment of a charge under pressure.

The treated charge is constituted by: 61.07% isoparaffins, 31.25% n-paraffins and 7.68%naphthenes, these percentages being expressed by weight. The R.O.N. of this charge is 77.30.

During the first step, the charge is injected into the column at a rate of 72 g per minute. Said column has a length of 1 m, a diameter of 35 mm and is filled with molecular sieve type 5A. Saturation of the sieve is obtained after 5 minutes of injection.

The operating conditions of the second step are as follows:

| | |
|---|---|
| Pressure | 20 bar |
| Temperature | 160° C |
| Carrier gas | Nitrogen |
| Flow rate | 20 l/min. |
| Time of periodic injection | '1 min. |
| Time of cycle | 4 min. |
| Charge flow rate | 1,080 g/hr. |

Since the rate of injection of the charge is the same during the two steps, $\lambda$ is equal to 20%.

The trapping technique is identical with that of the preceding examples and the trapping efficiency is 86%.

There is obtained at the outlet of the column a flow rate of isoparaffin cut of 525 g/hr. The R.O.N. value of this cut is 84. The flow rate of the n-paraffin cut is 405 g/hr.

The extraction rate obtained as defined in the preceding examples in 79%.

As can be observed, the improvement in the R.O.N. value is superior in this example to that obtained in the best of the previous examples (Example 7).

What is claimed is:

1. A method for the treatment of a gas mixture which permits the separation of at least one of the constituents of the gas mixture, which comprises
   1. continuously injecting the gas mixture to be treated into a column swept by a continuous stream of carrier gas and containing a selective solid adsorbent of the chromatographic type, which will retain the desired constituent of the gas mixture without retaining the non-desired constituent, until saturation of said selective adsorbent by the desired adsorbed constituent of the gas mixture, and
   2. discontinuing the continuous injecting of said gas mixture while periodically injecting small quantities of the gas mixture to be treated and representing a fraction of the quantity injected into the column during step (1) so as to collect successively at the outlet of the column a fraction which is enriched in the non-adsorbed constituent and a fraction of the purified adsorbed constituent.

2. The method according to claim 1, wherein the quantities of gas mixture to be treated and injected during step (2) are less than 40% by weight of the quantity which it has been necessary to inject for the saturation of the selective adsorbent during step (1).

3. The method according to claim 1, wherein the time-duration of the periodic injections of the gas mixture to be treated during step (2) is within the range of 1 to 120 seconds and wherein the time of each cycle is within the range of 10 to 800 seconds.

4. The method according to claim 3, wherein the ratio $$\frac{\text{injection time}}{\text{cycle time}}$$

is less than 0.4.

5. The method according to claim 1, wherein said method is carried out at a temperature within the range of 20° to 500° C and at a pressure within the range of 1 to 100 bar.

TABLE I

| Examples | 4 | 5 | 6 | 7 | 8 | 9 | 10 | 11 |
|---|---|---|---|---|---|---|---|---|
| Temperature ° C | 100 | 100 | 100 | 145 | 145 | 145 | 145 | 145 |
| Charge flow rate g/h | 1000 | 1000 | 1000 | 960 | 960 | 1278 | 1367 | 1367 |
| H$_2$ flow rate l/mm | 5.5 | 9.2 | 9.2 | 9.2 | 9.2 | 9.2 | 9.2 | 15.8 |
| H$_2$/HC | 1.20 | 2 | 2 | 2.08 | 2.08 | 1.5 | ≈1.5 | 2.46 |
| Cycle duration mins | 4 | 4 | 4 | 4 | 4 | 3 | 3 | 3 |
| Delivery cycle | iso 5″→67″ nor 67″→4′ | 5″→65″ 65″→4′ | 5″→75″ 75″→4′ | 5″→65″ 65″→4′ | 5″→75″ 75″→4′ | 5″→75″ 75″→3′ | 5″→75″ 75″→3′ | 5″→75″ 75″→3′ |
| Column length m | 1 | 1 | 1 | 1 | 1 | 1 | 0.47 | 0.47 |
| VVH | 1.24 | 1.24 | 1.24 | 1.19 | 1.19 | 1.6 | 3.36 | 3.36 |
| λ (%) | 12.5 | 12.5 | 12.5 | 12 | 12 | 12 | 27.2 | 27.2 |

TABLE II

| Examples | 4 | 5 | 6 | 7 | 8 | 9 | 10 | 11 |
|---|---|---|---|---|---|---|---|---|
| Flow rate iso g/hr | 694.9 | 614 | 728 | 735 | 781 | 1034 | 1092 | 1044 |
| Flow rate n g/hr | 175 | 350 | 228 | 146 | 112 | 148 | 230 | 100 |
| Trapping efficiency | 87% | 96.4 | 95.6 | 92 | 93 | 92.5 | 96.7 | 83.7 |
| Extraction rate | 63.4% | 80.7 | 70.2 | 80.7 | 74.4 | 67 | 46.4 | 54 |
| R.O.N.* | 86.9 | 87.4 | 87.1 | 88 | 87.2 | 86.6 | 86 | 86 |

*The R.O.N. value is measured on the iso cut.

6. The method according to claim 1, wherein the carrier gas employed is selected from the group consisting of nitrogen, helium and hydrogen.

7. The method according to claim 1, wherein the gas mixture to be treated consists essentially of n-paraffins and isoparaffins and wherein the selective solid adsorbent employed is a molecular sieve type 5A.

8. The method according to claim 1, which is practiced at substantially isothermal and isobaric conditions.

9. The method according to claim 8, wherein:
the quantities of gas mixture to be treated and injected during step (2) are less than 40% by weight of the quantity which it has been necessary to inject for the saturation of the selective adsorbent during step (1);
wherein the time-duration of the periodic injections of the gas mixture to be treated during step (2) is within the range of 1 to 120 seconds and wherein the time of each cycle is within the range of 10 to 800 seconds;
and wherein the ratio injection time/cycle time is less than 0.4.

10. The method according to claim 8, wherein the gas mixture to be treated consists essentially of n-paraffins and isoparaffins.

11. The method of claim 8, wherein, during said successive collection of a fraction enriched in non-adsorbed constituent and a fraction purified of the adsorbed constituent, an elution front of adsorbed constituent is recovered which has superimposed thereon concentration peaks of the non-adsorbed constituent.

12. The method of claim 11, wherein the elution front has a high proportion of n-paraffins and the concentration peaks have a high concentration of iso-paraffins.

* * * * *